Patented Jan. 24, 1939

2,144,694

UNITED STATES PATENT OFFICE 2,144,694

ASPHALTIC PRODUCT AND METHOD OF PRODUCING SAME

Percy L. Smith, Beaumont, Tex., Vladimir L. Shipp, New York, N. Y., and Arthur H. Boenau, Long Island City, N. Y., assignors to Socony-Vacuum Oil Company, Incorporated, New York, N. Y., a corporation of New York No Drawing. Application May 7, 1935, Serial No. 20,188

8 Claims. (Cl. 196—13)

This application has to do with the provision of a novel asphaltic product. It also has to do with the provision of a method for making this novel product, and further with the provision of a novel method for making asphaltic products having properties and specifications heretofore known. The asphaltic products referred to herein are derived from petroleum or petroleum residues, and are of the type suitable variously for such uses as road making, manufacture of paving materials, binders, coating compositions, impregnating compositions, and the like. The invention has to do with the manufacture of steam refined residual materials of this type, and also with the manufacture of so-called blown asphalts, and it is more specifically concerned with the manufacture of blown asphalts.

Blown asphalts have been manufactured heretofore from residual oils derived from petroleums, by blowing same with air at elevated temperatures. According to usual practice, the residual oil may be blown with air at elevated temperatures, say 400° F. to 500° F., until the desired consistency of the asphalt is obtained, usually requiring several hours. The result of this operation is dehydrogenation, condensation and polymerization, resulting in an increase in the asphaltic nature of the oil so treated and the production of an asphaltic product. The blowing process is employed to produce asphaltic products of various consistencies, or grades, as determined by ductility, melting point, penetration, etc., the extent of the alteration being determined by the conditions and length of time of blowing.

Blown asphalts as heretofore produced, and especially those of high fusing point and high hardness, have the disadvantage of being "short", or in other words, they lack ductility. This tendency sometimes may be minimized to a limited extent by careful operation, but with very many residual oils capable of being converted into otherwise desirable asphalts by blowing, no amount of care will serve to produce products of desirable ductility. Ductility or lack of "shortness" is a very desirable property, contributing extensively to the capability of pavements and similar structure produced from the asphalt to withstand wear, disintegration under traffic shock, mechanical stresses due to temperature changes, weathering, etc. Ductility is a measure of the cementing power of asphalt; the higher the ductility, the more filler the asphalt can absorb without objectionably impairing the mechanical strength of the mixture. The lack of ductility in the blown residual products heretofore produced has deprived a considerable volume of semi-asphaltic oils from ready access to a desirable market.

It is an important object of this invention to provide a novel blown asphaltic product of exceptionally high ductility, and to provide a novel asphalt which possesses combined properties of low penetration or high hardness and high ductility not heretofore attained in products of the kind referred to herein; also combined properties of high ductility and low ratio of penetration at different temperatures not heretofore attained in blown products. It is an object of this invention to provide a method for making this novel asphaltic product from petroleum.

It is a further important object of the invention to provide a novel process for the manufacture of asphalts of grades heretofore produced, by means of which process certain specifications as to properties of the asphalt can be met more readily, asphalts produced from certain residuums can be made to meet certain specifications not heretofore attainable from such residuums, and the like. A further object is the provision of a process for the manufacture of asphalts of high ductility for a given hardness in which the degree of ductility attained is controllable within certain limits. A further object is to provide a process of manufacturing blown asphalts wherein extensive and prolonged blowing may be made use of without undue degradation of product as expressed by loss of ductility or increase of shortness, thereby increasing yield of asphalt of a given penetration. Further objects are control of solubility and reduction of paraffin scale content of asphalts made from wax containing crudes.

In accordance with the process of this invention, petroleum stocks, usually residual stocks, are treated by admixing them with one or more solvents, having a selective action or solvent power on the paraffinic or the naphthenic constituents of the stock, and resulting in the separation of the stock into two portions or layers, one portion being more paraffinic and the other portion being more naphthenic than the original stock. The more naphthenic portion, or naphthenic extract, is, in accordance with the present invention, ordinarily subjected to distillation to remove naphthenic solvent and to remove lighter oils if desired, and is then steam refined or air blown to produce an asphaltic product. An example of a selective solvent operation of the kind just referred to which is suitable for the uses of this invention is the two solvent operation set forth in U. S. Patent No. 1,912,349, wherein the residual petroleum stock is subjected to simultaneous countercurrent contact with two solvents flowing in opposite directions, to be partitioned between said two solvents. One solvent is propane held within the system in liquid form by the application of suitable pressures and temperatures, and the other solvent is cresylic acid. When the more paraffinic layer is removed from the system, it contains propane and more paraffinic portions of the petroleum stock; when the naphthenic extract layer is removed from the system it contains cresylic acid and more naphthenic portions of the stock, including tarry or asphaltic matter. A similar separation of the initial petroleum stock can be effected by the use of various other solvents, or combinations thereof, applicable to the solvent refining of residual oils, such as phenol, dichloroethylether, nitrobenzene, chloraniline, benzyl alcohol, furfural, phenetidine; etc. The use of various solvent agents of the class referred to results generally in the separation from residual fractions of crude petroleum oil of materials of generally similar characteristics, designated herein as solvent tar.

We have discovered that asphaltic products can be produced by steam refining or air blowing these solvent tars, which asphaltic products are characterized by an unusually high and persistent ductility, which remains well above the required minimum limit even with extended blowing periods. We have discovered that these asphaltic products may be used as blending agents to endow other blown asphalts with a highly desirable ductility. The increase in ductility so produced may be obtained over wide limits without objectionable alteration in other desirable properties of blown asphalts, and is controllable, thus providing a method whereby desirable characteristics of blown asphalt, for example, ductility, temperature susceptibility or penetration ratio, and hardness, can be brought to desirable values in the same asphalt.

The methods of test referred to herein are as follows:

*Penetration.*—Distance of penetration of specified needle loaded with specified weight at specified temperature for specified time, A. S. T. M. method number D5-25, Penetration of bituminous materials. As used herein, penetration at 77° F. shall mean 100 grams for 5 seconds, and penetration ratio shall mean the ratio of penetration at 77° F., 100 grams, 5 seconds, to penetration at 32° F., 200 grams, 60 seconds.

*Ductility.*—Elongation before breaking of a specified sample pulled apart at a specified speed at a specified temperature, A. S. T. M. tentative method number 4, D113-32T, Ductility of bituminous materials.

*Melting point.*—(Softening point) ring and ball method, A. S. T. M. method D36-26, Softening point for bituminous materials.

These are standard methods of test used in the industry.

By the method of this invention, we have produced asphalts from solvent tars as hard as 15 and even 8 to 10 penetration at 77° F. (100 grams, 5 seconds) and having a ductility of over 100 cms. at 77° F., whereas heretofore none of the commercially available asphaltic stocks could be blown to a grade harder than 20 to 25 penetration and still possess a ductility of 100 or better.

Use of solvent tars, obtained by solvent refining of heavy petroleum cuts or residua in accordance with this invention allows an independent control of the ratio of penetrations at 77° F. and 32° F. and of the ductility. Heretofore, only in special instances, e. g., steam refining of selected Mexican crude, but not air blowing, has it been possible to obtain, for paving grades of asphalts, a ratio of penetrations (77° F., 100 grams, 5 seconds to 32° F., 200 grams, 60 seconds) as low as 3.0 and still retain a ductility of 100+. When attempting to obtain a penetration ratio of 2.5 or lower for the same paving grades by air blowing, the ductility was decreased below 65. However, according to the present invention, by the use of solvent tars as blending agents, before or after the air blowing, in combination with various asphaltic stocks which when used by themselves are unsuitable for the purpose, it has been made possible to produce air blown paving asphalts of any desired penetration at 77° F. within the range 50 to 70 with a penetration ratio of substantially 3.0 or lower and a ductility of 100 plus; and with a penetration ratio of 2.5 or lower and a ductility of 65 or higher.

*Examples*

(1) Venezuelan residuum 420° F. flash____ 65 Percent
    Solvent tar_____ 33.3

Air blown

| Pen. at 77° F. 100 gr., 5 sec. | Pen. at 32° F. 200 gr., 60 sec. | Ratio | Duct. at 77° F. |
|---|---|---|---|
| 70 | 23 | 3.04 | 100+ |
| 50 | 17.5 | 2.86 | 100+ |

(2) Smackover residuum_____ 66.7 Percent
    Solvent tar_____ 33.3

Air blown

| Pen. at 77° F. 100 gr., 5 sec. | Pen. at 32° F. 200 gr., 60 sec. | Ratio | Duct. at 77° F. |
|---|---|---|---|
| 71 | 29 | 2.45 | 110+ |
| 55 | 25 | 2.20 | 90 |
| 47 | 21 | 2.24 | 65 |

As an example of asphaltic materials of desirable properties, we reproduce in part the specifications of the State of Texas for such materials. These specifications are as follows:

| Grade | Pen. at 77° F. 100 gr., 5 sec. | Pen. at 32° F. 200 gr., 60 sec. | Ductility at 77° F., centimeters | Melting Point, °F. |
|---|---|---|---|---|
|  |  | *Minimum* | *Minimum* |  |
| OA 230-T | 210-250 | 50 | 50 | 86-122 |
| OA 90 | 85-100 | 30 | 50 | 113-140 |
| OA 55 | 50-60 | 22 | 50 | 113-140 |
| OA 45 | 40-50 | 18 | 40 | 113-140 |

In the specification given, the 32° penetration ranges from a minimum of 50 to a minimum of 18 for the several grades, while the ductility ranges from a minimum of 50 cms. to a minimum of 40 cms. for the several grades. As a matter of general operation in the production of blown asphalts, it is difficult to produce asphalts which, for the particular degrees of hardness stated, have ductilities above the minima stated.

As an illustrative example of what can be accomplished in the control of ductility and penetration is blown asphalts made in accordance with this invention, we give the following: A solvent tar was prepared by treating Oklahoma City residuum with propane and cresylic acid in a counter current operation, as above described. This tar had the following properties:

| | |
|---|---|
| Specific gravity at 77° F | 1.0128 |
| Flash | 470° F. |
| Gravity °A. P. I. at 60° F | 7.0 |
| Furol viscosity at 122° F | above 5000'' |
| Furol viscosity at 210° F | above 181'' |
| Pour | 95° F. |
| Penetration 77° F., 100 gr. 5 sec | soft |
| Ductility 77° F | soft |
| 100 penetration asphalt content | 88.0% |
| Paraffin scale | 0.457% |
| Soluble in CCl₄ | 99.97% |
| Soluble in A. S. T. M. petroleum ether | 98.31% |

This tar cannot ordinarily be used for the production of asphalts, either by steam reduction or by air blowing, which will meet specifications such as the above, since the asphalt resulting from such reduction is almost invariably possessed of a penetration at 32° F. below the minimum specified. We have discovered however that blown asphalts so produced are possessed of unusually high ductilities even in those grades most highly blown. As an example of the properties of such blown asphalts produced according to this invention from the above solvent tar, when blown to melting points corresponding to the various grades of the Texas specifications, asphaltic products having properties as follows were produced:

| Grade | Pen. at 77° F. 100 gr., 5 sec. | Pen. at 32° F. 200 gr., 60 sec. | Ductility at 77, centimeters | Hours blown |
|---|---|---|---|---|
| OA 230-T | 244 | 37 | 110+ | 23 |
| OA 90 | 95 | 14 | 110+ | 55 |
| OA 55 | 60 | 10 | 110+ | 74 |
| OA 45 | 44 | 6 | 110+ | 84 |
| | 16 | 3 | 110+ | 113 |

Solvent tar of the kind used in this example can, by continued blowing, be reduced to a penetration at 77° F., even as low as 8 or 10, with ductility still at least 100.

As will be noted, the penetration at 32° F. is below the minimum specification for every grade. However, most striking is the fact that on all grades the ductility at 77° is above the capacity of the machine (110+). This is most unusual and particularly so in the case of the harder, high melting point, more highly reduced, more highly blown residues. When processing many asphaltic and semi-asphaltic crudes as heretofore done by steam reduction or by air blowing to the desired lower penetration or harder grades, when satisfactory melting point and penetration are found, the ductility at 77° F. is always low, and usually below the minimum specified.

We have found that eminently satisfactory grades of asphalt may be produced in accordance with this invention by blending solvent tars, before blowing, or blown solvent tars, after blowing, with the asphaltic or semi-asphaltic oils or asphaltic products obtained by blowing same, customarily used for the production of blown asphalt.

For instance by blending 33⅓% of the above mentioned solvent tar with 66⅔% of a 565° F. flash Smackover residuum, and blowing the mixture at a temperature of 475° F. for appropriate lengths of time, commercial grades of asphalt conforming to the following tests were obtained.

| Grade | Pen. at 77° F. 100 gr., 5 sec. | Pen. at 32° F. 200 gr., 60 sec. | Ductility at 77, centimeters | Melting point, °F. |
|---|---|---|---|---|
| OA 230-T | 230 | 56 | 110+ | 103 |
| OA 90 | 91 | 34 | 110+ | 117 |
| OA 55 | 55 | 25 | 90 | 130 |
| OA 45 | 47 | 21 | 65 | 134 |

It will be seen that these products conform to the specifications set forth above, the high ductility being obtained without sacrifice of the other desirable properties, such as the penetration at 32° F. Thus in the blend, the solvent tar imparts a high ductility value comparable to that possessed by oxidized solvent tars alone, and, at the same time, the desirable low temperature susceptibility value of the straight run residua is not substantially altered or sacrificed by being raised to an undesirable value since the blended asphalt has practically as low a temperature susceptibility value as would be possessed by straight run residua when oxidized alone. As an additional advantage, these products are substantially entirely free from paraffin, usually found to be a detrimental ingredient in such products, the paraffin having been separated in the solvent treating step of the process.

The term solvent tar shall mean the portion of the petroleum stock, or any part thereof, which is separated out by any solvent or agent of the class referred to herein, either naphthenic or paraffinic, or any combination of such solvents, and which is suitable for forming asphaltic products according to the procedure described herein; and the term solvent shall mean any such solvent or agent, or combinations thereof.

We claim:

1. The method of making an asphalt having the combined properties of high ductility and low temperature susceptibility, which comprises blending a solvent tar containing asphalt, said solvent tar having the property of forming an asphalt of high ductility and high temperature susceptibility when oxidized alone, with a straight run distillation residue containing asphalt and a substantial amount of oil, said distillation residue having the property of forming an asphalt of low ductility and low temperature susceptibility when oxidized alone, and oxidizing said blended mixture to form an asphalt having a ductility not less than about 65 cm. at 77° F. and a temperature susceptibility not substantially greater than about 4 at 77° F. and 32° F.

2. The method of making an asphalt having the combined properties of high ductility and low temperature susceptibility, which comprises admixing a residual petroleum oil containing asphalt with a solvent to extract a solvent tar containing asphalt, said solvent tar so produced having the property of forming an asphalt of high ductility and high temperature susceptibility when oxidized alone, blending said solvent tar with a straight run distillation residue containing asphalt and a substantial amount of oil, said distillation residue having the property of forming an asphalt of low ductility and low temperature susceptibility when oxidized alone, and oxidizing said blended mixture to form an asphalt having imparted to it a ductility not substantially less than would be produced by oxidizing said solvent tar alone and which has not sacrificed the desirable low temperature susceptibility property which would be produced by oxidizing said residue alone.

3. The method of making an asphalt having a ductility of not less than about 65 cm. at 77° F. and a penetration ratio at temperatures of 77° F. and 32° F. of not more than about 3.0, which comprises admixing a residual petroleum oil containing asphalt with a selective solvent comprising a preferential solvent for paraffinic portion and a preferential solvent for naphthenic portion in order to extract a paraffinic portion and to extract a naphthenic portion comprising a solvent tar containing asphalt, said solvent tar having the property of forming an asphalt of high ductility and high temperature susceptibility when oxidized alone, blending said solvent tar with a straight run distillation residue containing asphalt and a substantial amount of oil, said distillation residue having the property of forming an asphalt of low ductility and low temperature susceptibility when oxidized alone, and oxidizing said blended mixture to form the desired asphalt.

4. The method of controlling the ductility of asphalts made by oxidizing residual petroleum oils containing asphalt without materially affecting the temperature susceptibility of such asphalts, which comprises selecting a residual petroleum oil from the group consisting of straight run distillation residues containing substantial amounts of oil and obtained from asphaltic and mixed base crudes, said distillation residues having the property of forming an asphalt of low ductility and low temperature susceptibility when oxidized alone, blending said distillation residue with a material selected from the group consisting of solvent tars of asphaltic and mixed base residual stocks, said solvent tars having the property of forming an asphalt of high ductility and high temperature susceptibility when oxidized alone, and oxidizing said blended mixture to form an asphalt having imparted to it a ductility not less than about 65 cms. at 77° F. and which has not sacrificed the desirable low temperature susceptibility property which would be produced by oxidizing the straight run distillation residue alone.

5. As a new composition of matter, an oxidized asphalt having a ductility not less than about 65 cms. at 77° F. and a temperature susceptibility not substantially greater than about 4 at 77° F. and 32° F., produced by blending a solvent tar containing asphalt, said solvent tar having the property of forming an asphalt of high ductility and high temperature susceptibility when oxidized alone, with a straight run distillation residue containing asphalt and a substantial amount of oil, said distillation residue having the property of forming an asphalt of low ductility and low temperature susceptibility when oxidized alone, and oxidizing said blended mixture to form the desired asphalt.

6. As a new composition of matter, an oxidized asphalt having a ductility of not less than about 65 cm. at 77° F. and a penetration ratio at temperatures of 77° F. and 32° F. of not more than about 3.0, produced by blending a material selected from the group consisting of solvent tars from asphaltic and mixed base residual stocks, said solvent tars having the property of forming an asphalt of high ductility and high temperature susceptibility when oxidized alone, with a material selected from the group consisting of straight run distillation residues containing a substantial amount of oil and obtained from asphaltic and mixed base crudes, said residues having the property of forming an asphalt of low ductility and low temperature susceptibility when oxidized alone, and oxidizing said blended mixture to form the desired asphalt.

7. As a new composition of matter, an oxidized asphalt produced by blending a material selected from the group consisting of solvent tars from asphaltic and mixed base residual stocks, said solvent tars having the property of forming an asphalt of high ductility and high temperature susceptibility when oxidized alone, with a material selected from the group consisting of straight run distillation residues containing a substantial amount of oil and obtained from asphaltic and mixed base crudes, said residues having the property of forming an asphalt of low ductility and low temperature susceptibility when oxidized alone, and oxidizing said blended mixture to form a blended asphalt having imparted to it a ductility at 77° F. not substantially less than would be possessed by said solvent tars when oxidized alone and which has not sacrificed the desirable low temperature susceptibility property which would be possessed by said residues when oxidized alone.

8. As a new composition of matter, an oxidized blended asphalt comprising an oxidized straight run distillation residue prepared from a residue containing asphalt and a substantial amount of oil and which alone produces an oxidized asphalt of low ductility and low temperature susceptibility, and a sufficient amount of an oxidized solvent tar, prepared from a solvent tar containing asphalt and which alone produces an oxidized asphalt of high ductility and high temperature susceptibility, to give the blended asphalt a ductility of at least 100 cm. at 77° F. and a temperature susceptibility not substantially greater than about 4 at 77° F. and 32° F.

PERCY L. SMITH.
VLADIMIR L. SHIPP.
ARTHUR H. BOENAU.

CERTIFICATE OF CORRECTION.

Patent No. 2,144,694.  January 24, 1939.

PERCY L. SMITH, ET AL.

It is hereby certified that error appears in the printed specification of the above numbered patent requiring correction as follows: Page 2, second column, line 30, for the numeral "33.3" read 35; page 3, first column, line 1, for "is" read in; line 26, for "penertation" read penetration; and that the said Letters Patent should be read with this correction therein that the same may conform to the record of the case in the Patent Office.

Signed and sealed this 21st day of March, A.D. 1939.

Henry Van Arsdale.

(Seal)  Acting Commissioner of Patents.